United States Patent Office 3,328,126
Patented June 27, 1967

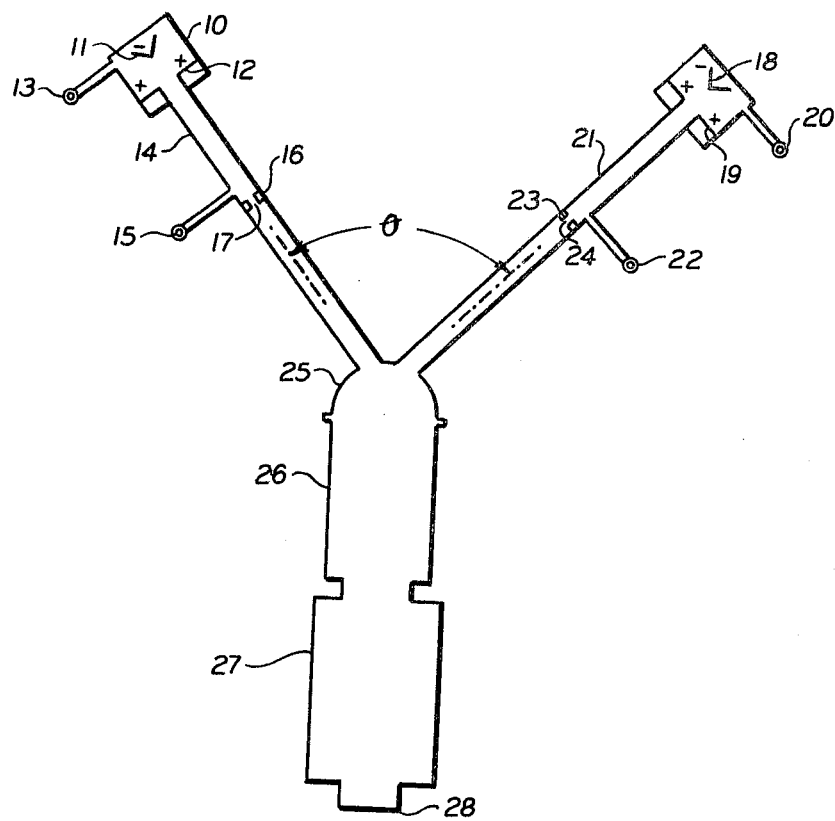

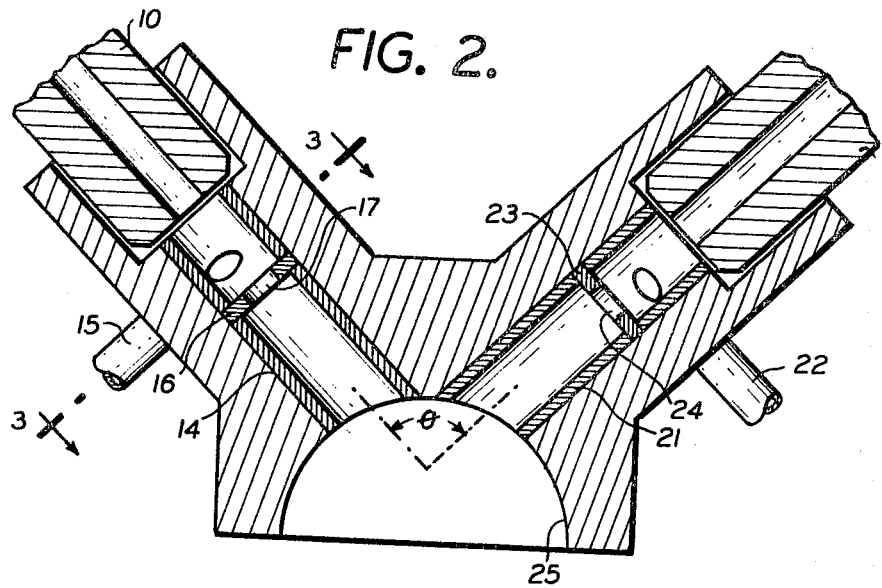
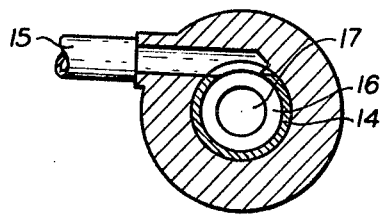

3,328,126
PIGMENT VIA PLASMA JET-IMPROVED
PREHEATER CONFIGURATION
Vincent Nunzio Di Stefano, Fairfield, Joseph Francis Skrivan, Stamford, and Gerard Butler, Norwalk, Conn., assignors to American Cyanamid Company, Stamford, Conn., a corporation of Maine
Filed Nov. 10, 1965, Ser. No. 507,098
6 Claims. (Cl. 23—202)

This invention relates to an improved process and apparatus for making particulate oxides of refractory metals and metalloids, and in particular, pertains to an improved method and apparatus for conducting high temperature oxidation processes with plasma jets utilizing an improved preheater configuration in which there are no geometric discontinuities between the mixing and reacting sections.

In industry, numerous and varied methods of producing refractory metal and metalloid oxides having pigment applications are widely known. Among these methods used, for example, to produce titanium dioxide, but applicable to other oxides as well, is the digestion of titaniferous ore material with sulfuric acid to produce titanium sulphate. The sulphate is then hydrolized to precipitate hydrous titanium dioxide, which in turn is calcined to produce pigment grade titanium dioxide. A disadvantage of this method is the wide, uncontrolled particle size of the product obtained, which usually requires further treatment before adaptation to pigment application.

Other widely known methods of producing oxides such as titanium dioxide or silicon dioxide include the reaction of their chlorides with oxygen at an elevated temperature, usually by burning an intimately mixed gas such as methane or carbon monoxide. Although the by-products of the gases are present during the reaction, they do not interfere with it to any extent. However, the overall reaction efficiency is detrimentally affected. Furthermore, the foregoing process usually necessitates a number of steps in the forming of the pigment grade oxide, requiring cumbersome and expensive equipment, from the standpoint of maintenance and initial capital outlay. Another problem generally encountered in the application of the processes described above, is that the oxide powders tend to be constituted of predominantly large particles. This problem is usually overcome through the addition of a nucleating agent to the reaction mixture such as aluminum chloride. The additional production costs incurred thereby, however, make this procedure highly undesirable in large-scale commercial operations.

A more recent, and generally satisfactory method of producing oxide powders, particularly titanium dioxide, without utilization of an auxiliary burning gas and with reduced amounts of nucleating agents, has been found in conducting the oxidation of a metal or metalloid salt with a plasma jet generator. This method contemplates passing a gas through a high energy electric arc, resulting in a plasma which is contacted with the material to be oxidized and oxygen. As applied here, the designation "plasma" is employed in describing a very hot, partially ionized gas stream. Consequently, the plasma is the source of heat for raising the reactants to the required temperature at which oxidation is initiated. Inasmuch as no by-products of burning are introduced into the gas stream, problems encountered with before described prior art methods are largely eliminated. Moreover, in view of the much higher temperatures which are attainable by this method, nucleation is much more general even without an added nucleating agent, perhaps due to the presence of electrically charged species in the plasma.

The general procedure employed in utilizing the plasma jet involves heating a gas such as nitrogen, argon, air, oxygen, etc., by means of an arc discharge to form a plasma stream. The reactants are brought either serially or simultaneously into intimate contact with the plasma stream in a manner such that the desired exothermic oxidation reaction is initiated. The resultant oxide product is secured by quenching the reactor effluent and entrapping by conventional means the precipitated oxide powder.

A feature of this method is that it is useful for the production of any kind of refractory metal or metalloid oxide or mixtures of such oxides. The oxidizable starting material can be any inorganic metal or metalloid salt such as a halide (for example, a chloride) or an oxyhalide (for example, the oxychloride). The metal or metalloid salts which can be converted are exemplified by silicon, titanium, aluminum, zirconium, iron and antimony compounds. It is feasible to use mixtures of such salts. Most important the oxidizable compounds which can be converted by the plasma jet oxidation process are silicon tetrahalide and titanium tetrahalide. These materials give oxide powders used in pigment, rubber and paper applications. Aluminum oxides suitable for gem manufacture may also be produced by oxidation of the corresponding aluminum salt.

While the plasma jet method of producing refractory metal and metalloid oxides unquestionably avoids many obstacles and pitfalls associated with previously known synthetic methods, it is not, unfortunately, without its shortcomings. Probably the most significant of these is the speed with which a desired chemical reaction occurs. While this may seem paradoxical since short reaction times are normally very desirable, in this case reaction occurs so quickly that the product is produced in the area immediately surrounding the point at which the second reactant meets the first. This can be better explained by way of example. If the plasma stream is contacted with vaporous salt, the salt is elevated to reaction temperature. If the heated stream continues to the point where the oxidizing gas is introduced, it is in condition for immediate reaction. As soon as the two reactants meet, the product oxide is formed and tends to deposit on the surfaces surrounding the oxygen inlet; thus deposition of the oxide proceeds, until finally, shut-down is required for purposes of unplugging the reactor. This, of course, is an extremely undesirable drawback in a commercial operation. Attempts to reduce plugging by use of relatively more plasma results in poor size distribution of the particulate product. In other words, it is extremely desirable from one standpoint and extremely undesirable from another standpoint to have the reaction proceed extremely quickly.

It is a primary object of the present invention to provide an improved method of preparing metal and metalloid oxide products with the use of plasma jets.

Another object of the present invention is to provide a method of preparing metal and metalloid oxide products with plasma jets wherein the rate of reaction is extremely high.

A further object of the present invention is to provide a method of preparing metal and metalloid oxide products whereby mixing of the reactants and the plasma in a complete and thorough manner is assured.

A more particular object of the present invention is to provided an apparatus for the preparation of metal and metalloid oxide products.

A still further object of the present invention is to provide an apparatus whereby complete mixing of the aforedescribed reactants and the plasma is achieved.

A particular object of the present invention is to provide an apparatus for the preparation of metal or metalloid oxide products, having improved characteristics for the enhanced and complete admixing of the gases whereby detrimental plugging of the apparatus is largely obviated.

In accordance with the present invention, at least one of the reactants is separately admixed with a plasma stream. For example, a metal or metalloid salt can be admixed with one stream of heat-supplying plasma, and, if desired, the oxygen-containing gas can be separately admixed with another stream of heat-supplying plasma.

In order to assure that the metal or metalloid salt is thoroughly admixed, the mixed gas stream is forced to pass through a restriction in its flow path. This in effect will create a turbulence in the gas stream causing the plasma and the reactant material to enhance its mixing rate and improve the homogeneity of the mixed gas and plasma stream. A similar restriction may be imposed in the path of flow of the combined plasma and oxygen-containing gas. The two streams, at least one of which has been heated by a plasma stream, are brought together after the salt and oxygen together have sufficient enthalpy to bring the mixture of reactants to reaction temperature. If only one reactant is heated with a plasma stream, it must have sufficient excess heat to raise the ultimate reaction mixture to reaction temperature. If all reactants are heated to above reaction temperature, then compensation is not necessary and none of the reactants must be heated much above the temperature at which reaction is initiated.

For the purposes of this invention, it is required that the reactant streams meet or converge at an angle with respect to each other, of between about 25° and 160° to form the reaction mixture, which is caused to flow along the path offering the least frictional resistance and producing the minimal change of momentum. It is noteworth that a converging angle of about 90° gives efficient and trouble-free operation for a long period. Use of equipment in which the angle is varied slightly from the preferred angle does not result in a significant change in efficiency of the reaction. When the angle at which the two reactant streams impinge goes much below 90°, i.e., in the range of 25°–50°, it is found that the reactant streams will not intermix properly before entering the reaction zone unless the streams are flowing together with sufficient momentum to assure turbulence. Thus, as a general rule, the smaller the angle of convergence, the higher should be the flow rate of the reactants. At these small angles, however, the problem of plugging is minimized and the particle size of the solid oxide product is generally smaller. If the angle of impingement is above 160°, efficiency of reaction is increased by reason of a higher order of mixing; but this increase in rate of reaction is accompanied by plugging problems. In view of the foregoing considerations, the preferred balance between high reaction and low plugging rates is obtained at practical reactant stream flow rates, when the angle of impingement of the two reactant streams is between 70° and 120°. Such an arrangement gives good mixing of the reactants without undue deposition of oxide on the walls of the reaction vessel.

One of the problems associated with the foregoing is the gradual build-up and agglomeration of solid particulate material on the walls of the reaction vessel in the region of intersection or mixing of the converging reactant streams. Eventually, this will cause plugging up of the apparatus in the region of the reactant stream mixing zone, affect the quality of the pigment and particle sizes, and result in frequent shut down of the equipment. In commercial applications of the process and apparatus, this in effect, may result in economically unattractive operating characteristics.

In order to overcome the foregoing problem, the apparatus of the present invention provides for an improved mixing zone at the point of intersection of the two reactant streams. The mixing zone generally comprises a hemispherical dome-shaped vessel which in a transitional manner extends into a coextensive cylindrical reactor. This, of course, will eliminate sharp corners in the apparatus which would impede the smooth flow of the mixing reactant streams into the reaction vessel. The reactant streams terminate at the surface of the hemispherical dome, the gradual curvature of which substantially obviates undue build-up of solid materials in the mixing region, thereby avoiding plugging of the apparatus through agglomeration of the particulate material.

Utilization of the improved hemispherical domeshaped mixing zone configuration has increased the yield of satisfactory pigment in the total product obtained. The amounts of particulate material not suitable for pigmentation has been reduced, for example, from 8% to 3% of the total metal or metalloid oxide product obtained.

The inert fluid used to form the plasma may be any gaseous material such as nitrogen, xenon, argon or helium. It is preferable that air is not used as the plasma heating the metal or metalloid salt. However, it is perfectly satisfactory if air or oxygen is used to form the plasma used in heating the oxidizing gas; and, indeed, if it itself is used to supply reactant oxygen.

Generally, the plasma should be heated to a temperature of about 3,000° C. to 12,000° C. prior to being admixed with the reactant. The quantity of reactant salt or salts which is admixed with a given amount of plasma depends, of course, on the desired reaction temperature and heat losses expected to occur before the reactants are admixed. In most operations, the quantity of plasma will be about 3–95% of the total gas mixture and preferably about 5–45% of the volume of the gas. The total volume of gases should be such that reactant streams flow together with turbulent mixing.

It is to be understood that the inert gas used to form the plasma may be preheated by any practical means before being fed into the plasma generator and, likewise, the individual reactants may be preheated by such means as recycle of reaction zone effluents. Normally, such conventional heat exchange methods can raise either the reactants or the inert gas to temperatures of about up to 600°.

The temperature at which the oxidation reaction is initiated will, of course, depend upon the particular salt which is being oxidized. Initiation temperatures are well known for such salts as the halides of aluminum, silicon, titanium, antimony and boron. The actual temperature to which the reactants are raised may be well above the initiation temperatures in order to hasten the rate of reaction and to reflect particle size requirements. In general, the reaction mixture should remain in the zone of reaction for a period of at least 0.001 second and, practically speaking, the residence need not be longer than one second. More usually, a residence of about 0.02 to .1 second is adequate and will give the product in the desired particle size.

In the case of titanium dioxide where it may be desired to enhance the yield of the rutile crystalline form as against the anatase form, a small amount of aluminum chloride may be fed into the reactant stream with the titanium tetrachloride. The amount of aluminum chloride used for this purpose may vary over a wide range. In general, about 0.16 to 6.3% or, more preferably, 1.6 to 4.7% by weight of the product oxide should be employed. Advantageously, titanium dioxide pigment produced by this method (with or without aluminum chloride) is found to have a large proportion of particles in the optimum size range of 0.13 to 0.22 micron.

The amount of oxygen used will, in the first instance, depend upon the stoichiometry of the reaction. For practical results, at least a stoichiometric amount should be used based upon the salt to be oxidized. It is normally desirable to have an excess of oxygen available for reaction. This excess can, without practical inconvenience, be as high as 100% by volume, or even higher. More usually, a 15–50% by volume excess of oxygen is employed with good results.

To provide a fuller understanding of the present invention, reference will now be had to the accompanying drawing, in which:

FIGURE 1 is a schematic view of an application of the process of the present invention;

FIGURE 2 is a cross-sectional view of a preheater for carrying out the process of the present invention; and FIGURE 3 is a sectional view along line 3—3 on FIGURE 2.

Referring now in detail to the drawings, FIGURE 1 shows a plasma jet generator 10. The plasma jet generator 10 includes a negative electrode 11 and an annular positive electrode 12, which are adapted to have an electric arc struck between them. Nitrogen, or any other suitable gas, is fed to the plasma jet generator 10 by means of a conduit 13. The nitrogen flows past electrode 11 and through electrode 12 into passageway 14. The arc is stabilized by the nitrogen stream and, in turn, the arc heats the nitrogen to the required temperature.

A conduit 15 is adapted to feed vaporous metal salt into passageway 14, where said salt is rapidly admixed with the plasma stream flowing therethrough. In close proximity to and downstream of the point where conduit 15 and passageway 14 intersect, a ring member 16 is positioned within passageway 14. Ring member 16 has a centrally located opening 17 which forms a constriction or throat area in passageway 14. This in effect will contrict the smooth flow of the admixed nitrogen plasma and said salt upstream of the ring member 16, and consequently create turbulence which will substantially enhance the mixing of the nitrogen plasma and said salt.

A second plasma jet generator of similar design to plasma jet generator 10 is positioned at an angle θ with respect to the latter. Angle θ may vary between 25° to 160° although its optimum value is approximately 90°. Said second plasma jet generator has negative electrode 18 and positive electrode 19 analogous to electrodes 11 and 12, hereinbefore described. A conduit 20 introduces nitrogen in the plasma jet generator. The nitrogen streams past electrode 18 and through electrode 19 into passageway 21, after having been heated to the desired temperature.

Conduit 22 is adapted to feed oxygen containing gas into passageway 21, so that the oxygen may mix with the nitrogen plasma stream. A ring member 23 having an opening 24 therethrough, substantially identical to ring member 16, is positioned in passageway 21 just downstream of the intersection with conduit 22. This will provide a constriction in passageway 21, thereby creating a turbulence therein and to a substantial degree enhance mixing between the oxygen and the nitrogen plasma stream.

The two passageways 14 and 21 terminate at a dome-shaped conduit or receptacle 25 which forms a mixing zone for the plasma heated reactant streams. Preferably dome 25 is of a generally hemispherical configuration, although it is to be understood by one skilled in the art that other configurations, for example, ellipsoids or paraboloids of revolution may also be applicable. Dome 25 is connected with a substantially cylindrical reactor vessel 26 having an inner section exactly equal to the outlet section of dome 25. By making the diameters of dome 25 and reactor vessel 26 exactly equal in size, sharp corners and surfaces, which would impede the smooth flow of the mixing gaseous and reactant material from the passageways 14 and 21, are avoided and a smoothly curved surface is provided in the mixing zone. This structure substantially avoids geometric dicontinuity between the mixing and reactive sections. This smooth transition surface for the gases emerging from passageways 14 and 21, will drastically reduce or eliminate agglomeration of solidifying oxide material on the walls of dome 25 and the reactor vessel 26. As a result, there is an appreciable reduction in the frequency of intervals at which the apparatus must be cleaned. This will greatly increase the operating efficiency and economy of the apparatus.

The heated mixture of oxygen containing gas and vaporous metal salt reacts in the reactor 26 to yield refractory oxide in particulate form. The reactor effluent is then conducted into heat exchanger 27 where the product is cooled and released through a pipe 28 to be further subjected to various conventional collecting, separating and conditioning procedures necessary and desirable to entrap the metal oxide, obtain gaseous by-products and/or recycle unreacted starting materials.

A further feature of the present invention lies in that conduit 15 is adapted to intersect passageway 14 in a tangential manner. This will create a vortex in the plasma stream while mixing with the metal salt and enhance mixing of these gases. A similar configuration may be utilized in connection with conduit 22 and passageway 21 to enhance mixing of the plasma stream and the oxygen.

Since the plasma stream generates an intense amount of heat ring members 16 and 23 may be preferably constituted of alumina or other refractory materials. Similarly, passageways 14 and 21 may be lined with alumina.

While particular embodiments of this invention are shown above, it will be understood that the invention is obviously subject to variations and modifications without departing from its broader aspects.

We claim:
1. A process of continuously preparing finely divided refractory oxides by contacting an oxygen stream with a stream of at least one member selected from the group consisting of vapourous metals and metaloid salts, which comprises admixing at least one of said reactant streams with a stream of gaseous fluid heated by means of a plasma generator to a temperature in the range of 3000°–12,000° C., contacting said reactant streams flowing at an angle with respect to each other of between 50° and 160°, said contacted reactant streams being mixed and reacted in a dome-shaped zone having no geometric discontinuities, for a period of about .001 to 1 second, and then collecting the resultant oxide product.

2. The process of claim 1 wherein said admixed reactant stream and gaseous fluid is passed through a zone of constricted flow prior to contact with said other reactant stream, whereby enhanced admixing of said gaseous fluid and said reactant stream is facilitated.

3. The process of claim 1 wherein the two reactant streams contact at an angle with respect to each other of 70° to 120°.

4. The process of claim 1 wherein the vaporous salt is titanium tetrachloride.

5. The process of claim 4 wherein aluminum chloride is introduced into one stream in an amount equal to about 0.16 to 6.3% by weight of product titanium dioxide.

6. In an apparatus for the continuous preparation of finely divided refractory oxides by the process of claim 1: at least one preheater device comprising a plasma generator, means adapted to admix at least one of said streams with a stream of heated gaseous fluids, converging passageway means for conveying and contacting said reactant streams at an angle with respect to each other of between 50° and 160°, an initial portion of a mixing and reacting chamber in communication with each of said passageway means adapted to receive said contacting reactant streams, and a second portion of said chamber connected to said initial portion, the chamber being generally of dome shape and said passageway means terminating substantially at the inner surface of said dome-shaped surface of said chamber, whereby there are no geometric discontinuities between said passageways and said chamber.

References Cited
UNITED STATES PATENTS 2,921,892   1/1960   Casey _____ 204—164

OSCAR R. VERTIZ, *Primary Examiner.*

EDWARD STERN, MILTON WEISSMAN, *Examiners.*